United States Patent
Bender et al.

(10) Patent No.: US 11,046,850 B2
(45) Date of Patent: Jun. 29, 2021

(54) MIXED METAL CATALYST COMPOSITIONS AND METHODS FOR MAKING POLYURETHANE FOAM

(71) Applicant: Evonik Operations GmbH, Essen (DE)

(72) Inventors: Jared Denis Bender, Breinigsville, PA (US); Joel R. Rogers, Quakertown, PA (US); Jean Louise Vincent, Bethlehem, PA (US); Robert Edward Stevens, Wescosville, PA (US)

(73) Assignee: Evonik Operations GmbH, Essen (DE)

(*) Notice: Subject to any disclaimer, the term of this patent is extended or adjusted under 35 U.S.C. 154(b) by 155 days.

(21) Appl. No.: 16/129,216

(22) Filed: Sep. 12, 2018

(65) Prior Publication Data

US 2019/0092942 A1  Mar. 28, 2019

Related U.S. Application Data

(60) Provisional application No. 62/563,815, filed on Sep. 27, 2017.

(51) Int. Cl.
| | |
|---|---|
| *C08J 9/228* | (2006.01) |
| *C08L 75/04* | (2006.01) |
| *C08G 18/22* | (2006.01) |
| *C08G 18/24* | (2006.01) |
| *C08J 9/14* | (2006.01) |
| *C08G 18/76* | (2006.01) |
| *C08G 18/48* | (2006.01) |
| *C08G 18/42* | (2006.01) |
| *C08G 18/16* | (2006.01) |
| *C08J 9/12* | (2006.01) |
| *C08G 101/00* | (2006.01) |

(52) U.S. Cl.
CPC ............ *C08L 75/04* (2013.01); *C08G 18/163* (2013.01); *C08G 18/227* (2013.01); *C08G 18/244* (2013.01); *C08G 18/246* (2013.01); *C08G 18/42* (2013.01); *C08G 18/48* (2013.01); *C08G 18/7671* (2013.01); *C08J 9/142* (2013.01); *C08J 9/228* (2013.01); *C08G 2101/00* (2013.01); *C08J 9/122* (2013.01); *C08J 9/141* (2013.01); *C08J 9/144* (2013.01); *C08J 9/146* (2013.01); *C08J 2203/142* (2013.01); *C08J 2375/04* (2013.01)

(58) Field of Classification Search
CPC .. C08G 18/163; C08G 18/227; C08G 18/244; C08G 18/246; C08G 18/42; C08G 18/48; C08G 18/7664; C08G 18/7671; C08G 18/792; C08G 2101/00; C08G 2101/0008; C08G 2101/0016; C08G 2101/0025; C08J 9/122; C08J 9/141; C08J 9/142; C08J 9/144; C08J 9/146; C08J 9/228; C08J 2203/142; C08J 2375/04; C08L 75/04
See application file for complete search history.

(56) References Cited

U.S. PATENT DOCUMENTS

| | | |
|---|---|---|
| 3,892,687 A | 7/1975 | Bechara et al. |
| 3,993,652 A | 11/1976 | Bechara et al. |
| 4,572,865 A | 2/1986 | Gluck et al. |
| 6,242,555 B1 | 6/2001 | DuPrez et al. |
| 6,825,238 B2 | 11/2004 | Hohl et al. |
| 2016/0145476 A1* | 5/2016 | Jordan, Jr. ......... C08G 18/7671 210/500.23 |
| 2016/0264711 A1* | 9/2016 | Krebs ................... C08G 18/18 |
| 2017/0226264 A1* | 8/2017 | Gunther ................ C08G 18/14 |
| 2017/0260320 A1* | 9/2017 | Bokern ................ C08G 18/755 |

FOREIGN PATENT DOCUMENTS

| | | |
|---|---|---|
| EP | 3091044 A1 | 11/2016 |
| WO | WO-2004000905 A1 * 12/2003 | ......... C08G 18/6688 |
| WO | 2016164671 A1 | 10/2016 |
| WO | WO-2016164671 A1 * 10/2016 | ......... C08G 18/7664 |

OTHER PUBLICATIONS

EP Search Report dated Feb. 5, 2019 corresponding to EP Application No. 18196425.5 filed Sep. 25, 2018 (9 pages).

* cited by examiner

*Primary Examiner* — John M Cooney
(74) *Attorney, Agent, or Firm* — Andrew H. Chung; Linda S. Li; Jason S. Ngui

(57) ABSTRACT

A composition and process to make polyurethane foam using a stable liquid catalyst composition comprising at least one liquid bismuth carboxylate catalyst and at least one liquid dialkyltin dicarboxylate complex are disclosed. The disclosed composition and process yield polyurethane foam having favorable properties, but requiring less metal. The polyurethane foams produced by this catalyst composition and method are useful for laminated boardstock, construction panels, appliance insulation, spray-applied insulation, seat cushions, and mattresses.

8 Claims, No Drawings

MIXED METAL CATALYST COMPOSITIONS AND METHODS FOR MAKING POLYURETHANE FOAM

FIELD OF THE INVENTION

The instant invention relates to catalyst compositions, composition comprising catalysts and methods for using the compositions for making foam.

BACKGROUND OF THE INVENTION

Polyurethane foam is an extremely versatile material that can be formulated for use in applications such as structural walls, roofs, refrigerator cabinets and garage doors, as well as mattresses, seat cushions, and pillows. One challenge faced by polyurethane foam formulators and manufacturers is to balance the competing reactions in the foam making process while increasing the rate of production of the foamed product. The rate of manufacture of the foamed product is dependent on the total cure time of the foam formulation. It is beneficial to minimize the total cure time, in order to increase commercial output in a given time period.

Virtually all commercially manufactured polyurethane foams are made with the aid of at least one catalyst. Catalysts are compounds that help promote the reactions between an isocyanate and isocyanate-reactive compounds and the isocyanate polymerization reaction. The types of catalysts that are typically utilized in the formation of rigid polyurethane foams may differ depending on the application. The ability to selectively promote either the blowing reaction (reaction of water with isocyanate to generate carbon dioxide), the gelling reaction (reaction of polyol with isocyanate) or the trimer reaction (polymerization of isocyanate to form isocyanurate) is an important consideration in selecting the proper catalyst.

If a catalyst promotes the blowing reaction to a high degree, much of the carbon dioxide will be evolved before sufficient reaction of isocyanate and polyol has occurred, and the carbon dioxide will bubble out of the formulation, resulting in a foam of poor quality and physical properties. In contrast, if a catalyst too strongly promotes the gelling reaction, a substantial portion of the carbon dioxide will be evolved after a significant degree of polymerization has occurred. This foam will typically be characterized by high density, broken or poorly defined cells, and/or other undesirable features. Finally, in those applications desiring the production of isocyanurate (trimer), if a catalyst does not generate enough heat (exothermic reaction) early on in the reaction, the amount of trimer that is produced will be low. Again, a poor quality foam, this time characterized by friability, poor dimensional stability and poor fire properties, will be produced.

Conventional polyurethane catalyst compositions and methods for making polyurethane foams and related products are described in the following patents and patent applications.

U.S. Pat. No. 4,572,865 describes a method for continuously producing an insulation board comprising a rigid plastic foam core having two major surfaces and a facing material on one or both of the major surfaces, the method including conveying a facing material along a production line, depositing a partially expanded froth foam of a plastic mixture, which contains at least one frothing agent, on the facing material, and further expanding and curing the froth foam in contact with the facing material to form the insulation board.

U.S. Pat. No. 3,892,687 describes quaternary hydroxyalkyl amine catalysts for promoting the formation of polyurethane foams.

U.S. Pat. No. 3,993,652 describes catalysts that, when prepared in the absence of water, are stable to heat and storage and show high activity in reactions involving organic isocyanates, such as in the production of polyurethane and polyisocyanurate resins.

U.S. Pat. No. 6,825,238 relates to polyurethane foams formed by the catalytic reaction of an aromatic polyisocyanate, a polyol, and a blowing agent and a process for preparing such polyurethane foams.

U.S. Pat. No. 6,242,555 describes a method for manufacturing elastomeric polyurethane mouldings using organometallic catalysts in a reaction injection molding (RIM) process.

The previously identified patents are hereby incorporated by reference.

Although organometallic compounds, such as carboxylate salts of tin and bismuth, are known in the art as useful catalysts in the manufacture of various polyurethane compositions, their use is limited by the inability of many of the preferred organometallic compounds to form stable mixtures when combined to form multicomponent catalyst compositions. At ambient conditions, many such mixtures result in the formation of precipitates which interfere with many manufacturing processes, such as spray foam polyurethane applications.

U.S. Pat. No. 6,242,555, for example, discloses that when organotin and organobismuth catalysts are used in combination in an RIM elastomeric polyurethane manufacturing process, they are mixed into separate components of the reaction mixture (Col. 10, lines 19-35). In an example, the organotin catalyst is added to the isocyanate component while the organobismuth catalyst is contained in the polyol blend component. This is necessary to provide chemical and physical stability of the components. The catalysts are not combined until they reach the RIM mixhead immediately before being injected into the mold.

The approach of segregating the catalysts in different components is limited to processes, such as RIM, where there is not enough time after the mixture of the catalysts to create stability problems. This approach is not possible in other types of polyurethane manufacturing, for example spray foam processes, where the catalysts must remain combined in a stable composition for longer time periods. In addition, it is also advantageous to have stable pre-mixed catalyst compositions comprising organotin and organobismuth catalysts that are formulated for specific applications which can be packaged, shipped and stored at the point of use until needed.

A number of factors drive a need for organometallic catalysts which produce greater reactivity and improved physical properties while using less catalyst material. As described more fully in U.S. Pat. No. 6,825,238, increasing the amount of metal carboxylate catalysts in a polyurethane foam formulation beyond a threshold amount will result in an excess of free acid that inhibits the catalyst and results in a polyurethane foam with inferior properties (Col. 13 lines 20-30). Cost and environmental hazards are also a concern with some organometallic compounds.

Therefore there exists an unmet need for organometallic catalyst compositions suitable for manufacturing polyurethane foams with desirable cured properties and a cure rate suitable for manufacturing processes, and which can achieve the results using catalyst compositions which form stable mixtures at ambient conditions. There is also a need for organometallic catalyst compositions with improved activity, which can produce high quality polyurethane foam using less metal.

BRIEF SUMMARY OF THE INVENTION

The instant invention solves the foregoing deficiencies and problems by providing a storage-stable liquid catalyst composition comprising a combination of at least one liquid bismuth carboxylate salt and at least one liquid dialkyltin dicarboxylate complex, as well as methods for using the catalyst composition for preparing a polyurethane foam. The catalyst compositions of the instant invention unexpectedly result in foam products having beneficial properties including acceptable curing times and balanced cure profiles, while requiring significantly lower overall catalyst content than comparable foams made with conventional catalyst compositions.

Foams according to the invention can be obtained by spraying, molding, and continuous pouring, using known equipment and methods. Preferably, the foam is produced using a two component polyurethane system comprising an isocyanate component and an isocyanate-reactive component which are mixed and stored separately until they are reacted together to produce the foam. The isocyanate reactive component preferably comprises a polyol, blowing agent(s), catalyst(s) and any other additives known in the art. The isocyanate reactive component is referred to herein as the pre-mix, pre-blend or resin.

One aspect of the invention relates to a catalyst composition comprising at least one liquid bismuth carboxylate salt and at least one liquid dialkyltin dicarboxylate complex.

An aspect of the invention relates to the foregoing catalyst composition wherein the bismuth carboxylate salt preferably has a structure of general formula I:

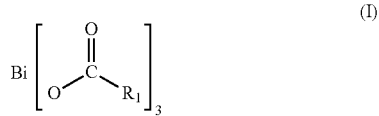

and the dialkyltin dicarboxylate complex preferably has a structure of general formula (II) or (III):

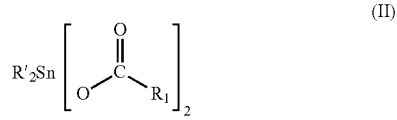

or

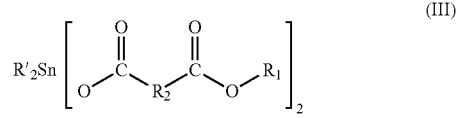

wherein $R_1$ is a branched $C_3$-$C_{20}$ alkyl or alkenyl group or substituted phenyl group, $R_2$ is a $C_1$-$C_6$ saturated or unsaturated linking group, and R' is a $C_1$-$C_{12}$ alkyl or alkenyl group.

Another aspect of the invention relates to any of the foregoing catalyst compositions wherein the bismuth carboxylate salt comprises at least one member selected from the group consisting of bismuth neodecanoate, bismuth 2-ethylhexanoate, and bismuth pivalate and the dialkyltin dicarboxylate complex comprises at least one member selected from the group consisting of dimethyltin dineodecanoate, dibutyltin di-2-ethylhexanoate, dibutyltin diiso-octylmaleate, and mixtures thereof.

In one aspect, the invention relates to a method for preparing foam comprising contacting at least one polyol, at least one isocyanate and at least one blowing agent in the presence of any of the foregoing compositions.

Another aspect of the invention relates to a method wherein the polyol comprises at least one polyester polyol.

In another aspect of the invention, the isocyanate comprises at least one member selected from the group consisting of hexamethylene diisocyanate, isophorone diisocyanate, phenylene diisocyanate, toluene diisocyanate ("TDI"), and 4,4'-diphenyl methane diisocyanate ("MDI").

The aspects of this invention disclosed herein can be used alone or in combination with each other.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

In the claims, letters may be used to identify claimed method steps (e.g. a, b, and c). These letters are used to aid in referring to the method steps and are not intended to indicate the order in which claimed steps are performed, unless and only to the extent that such order is specifically recited in the claims.

Method of Preparing a Polyurethane Foam

One aspect of the invention relates to a method for preparing polyurethane foam using the catalyst compositions described herein. A process according to the invention can be carried out using conventional equipment for making rigid foams. A catalytically effective amount of the catalyst composition of the invention is used in a polyurethane formulation comprising at least one polyisocyanate, at least one polyether or polyester polyol, and at least one blowing agent. Optionally, compatibilizers, amine catalysts, and additives such as cell stabilizers and fire retardants may also be present.

In an embodiment, a pre-blend, also referred to herein as a pre-mix or resin, comprising all of the foam components, except for the polyisocyanate, can be prepared by using conventional equipment and methods by metering the appropriate masses into an appropriate mixing/holding vessel, and agitating, using any of several mechanical means, until a homogeneous mixture (the pre-mix) is achieved. Then, the pre-mix is contacted with any remaining ingredients and the polyisocyanate component in order to produce a foam. The preferred compositions of the polyisocyanate component and the resin or pre-mix component are discussed below.

In an embodiment, the catalysts for a particular polyurethane manufacturing operation may be pre-mixed into a storage-stable catalyst composition, then later added to the other components of the resin. The catalyst composition preferably contains one or more catalysts and, optionally, a diluent. Catalysts are typically employed in small quantities relative to the resin formulation. Pre-mixing and the use of diluent decrease the need for accurately measuring small quantities of catalyst during a manufacturing operation.

Foams obtained using the method of the instant invention can be used for a wide range of applications including appliance insulation (e.g., insulating refrigerators or water heaters), structural insulation (e.g. spray foams or lamination foams for commercial or residential insulation), among other known uses. The isocyanate index, the amount of isocyanate required to react with the polyol and any other reactive additives, can be tailored for the intended foam usage and is determined by stoichiometric calculation using techniques known in the art. Exemplary techniques and stoichiometric calculations related to the isocyanate index are described in Polyurethane Foam Basic Chemistry and Polyurethane Foam Polymerization Reaction, in *Flexible Polyurethane Foams*, by Ron Herrington, Kathy Hock, Randy Autenrieth, et al, published by Dow Chemical Co., 1997.

Preferably, the isocyanate index for polyurethane foams of the present invention ranges from 90 to 400, more preferably, from 120 to 300, and most preferably, from 150 to 250.

The Polyisocyanate Component

Examples of preferred polyisocyanates include hexamethylene diisocyanate, isophorone diisocyanate, phenylene diisocyanate, toluene diisocyanate ("TDI"), and 4,4'-diphenyl methane diisocyanate ("MDI") and mixtures thereof. More preferred polyisocyanates are 2,4- and 2,6-toluene diisocyanate, individually or together as their commercially available mixtures. Other preferred mixtures of diisocyanates are those known commercially as "crude MDI", which contains about 60% of 4,4'-diphenylmethane diisocyanate along with other isomeric and analogous higher polyisocyanates. Also preferred are "prepolymers" of these polyisocyanates comprising a partially pre-reacted mixture of polyisocyanates and polyether and polyester polyol.

The amount of polyisocyanate component that is contacted with the resin component to drive the foam-producing reaction preferably ranges from 100% to 200% by weight of the resin, more preferably, from 115% to 170% by weight of the resin, and most preferably, from 120% to 150% by weight of the resin.

The Resin or Pre-mix Component

Polyol

Preferred polyols include those polyols typically used in the art for preparing, for example, rigid PIR foam including the polyalkylene ether and polyester polyols and combinations thereof. The preferred polyalkylene ether polyols include poly(alkyleneoxide) polymers such as poly(ethyleneoxide) and poly(propyleneoxide) polymers. The preferred polyalkylene ether polyols also include copolymers with terminal hydroxyl groups derived from polyhydric compounds including diols and triols, for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and the like, and low molecular weight polyols. Also preferred are amine polyether polyols which can be prepared when an amine, such as ethylenediamine, diethylenetriamine, tolylenediamine, diphenylmethanediamine, triethanolamine or the like is reacted with ethylene oxide or propylene oxide. Preferred polyols also include mannich polyols, recycled polyols, soy polyols, sucrose or sugar based polyols, carbon dioxide based polyols and mixtures thereof.

In one aspect of the invention, a single high molecular weight polyether polyol may be used. Also, mixtures of high molecular weight polyether polyols such as mixtures of different multifunctional materials and/or different molecular weight or different chemical composition materials may be used.

Useful polyester polyols include those produced when a dicarboxylic acid is reacted with an excess of a diol for example adipic acid or phthalic acid or phthalic anhydride with ethylene glycol or butanediol or reacting a lactone with an excess of a diol such as caprolactone with propylene glycol.

Preferably, the amount of polyol ranges from 65% to 85% by weight of the resin component, more preferably, from 70% to 80% by weight of the resin component, and most preferably, from 72% to 75% by weight of the resin component.

The Catalyst Composition

An aspect of the invention is the discovery of combinations of organometallic bismuth (III) and tin (IV) compounds that form storage-stable liquid mixtures. As used herein, the term "combination" refers to a composition that is a homogenous mixture of at least two components. As used herein "storage-stable" means that the composition remains a homogeneous liquid at ambient conditions without any significant precipitate formation. As used herein the term "ambient conditions" means from 20 degrees C. to 30 degrees C. at 1 atm (101 KPa) pressure, +/−5%. As used herein, "significant precipitate formation" means formation of a quantity of solid precipitate that is at least 0.01% by weight of the catalyst composition. Preferably, the catalyst composition is storage stable for at least 1 hour, more preferably for at least 24 hours, most preferably for at least 30 days.

Another aspect of the invention is that these storage-stable liquid combinations of organometallic bismuth (III) and tin (IV) compounds have found unexpectedly high activity as catalysts in polyurethane foam applications. The high catalytic activity means that the same catalytic effect achieved using prior art catalysts can be obtained using less catalyst. This allows for methods of production of polyurethane foams with the same desirable properties and cure times as those produced with prior art organometallic catalysts, but using significantly less metal.

The catalyst composition of the present invention preferably comprises a combination of at least one liquid bismuth carboxylate salt and at least one liquid dialkyltin dicarboxylate complex. The weight percentage ranges of the at least one bismuth carboxylate salt to the at least one dialkyltin dicarboxylate complex preferably range from 90% bismuth salt and 10% tin complex, to 10% bismuth salt and 90% tin complex. The weight ratio of the at least one bismuth carboxylate salt to the at least one dialkyltin dicarboxylate complex is preferably from 9 to 1 to 1 to 9. As used herein and in the claims, the weight ratio or weight percentage of the at least one bismuth carboxylate salt to the at least one bismuth carboxylate salt is the weight ratio or percentage of all bismuth carboxylate salts to all dialkyltin dicarboxylate complexes, if more than one of either is present in the catalyst composition. This convention applies similarly to the weight percentage or ratios of other components expressed herein with the article "at least one of."

In an aspect of the invention, the catalyst composition is combined with at least one diluent. Diluents have several purposes. For example, they can be used to improve viscosity of the composition to facilitate pouring or pumping. In a preferred embodiment, diluent is used to make the catalyst composition more easily measured or metered by eliminating the need to measure small quantities of pure catalyst ingredients. In a preferred embodiment, pre-mixed catalyst compositions comprising a combination of organometallic catalysts and diluent are prepared in advance of use and stored until needed. Examples of preferred diluents include ethylene glycol, propylene glycol, di-ethylene glycol, di-propylene glycol, as well as poly-ethylene or poly-propylene glycols in the 100-1000 molecular weight range. Preferably, the amount of diluent ranges from 20% to 70% by weight of the catalyst composition, more preferably from 25% to 50% by weight of the catalyst combination and most preferably from 25% to 35% by weight of the catalyst combination.

Bismuth Carboxylate Salt

The catalyst composition of the present invention preferably comprises a bismuth carboxylate salt that has the structure of general formula I:

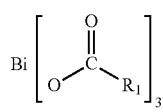
(I)

wherein $R_1$, is a branched $C_3$-$C_{20}$ alkyl or alkenyl group or substituted phenyl group.

In an aspect of the invention, bismuth carboxylate salts where R1 is a branched alkyl group of at least 3 carbons are found to be more stable in combinations with dialkyltin dicarboxylate complexes than compounds where R1 is a linear alkyl group, or an alkyl group of fewer than 3 carbon atoms. These branched alkyl carboxylates of bismuth, in combinations with dialkyltin dicarboxylate complexes, provide the same or better catalytic characteristics as prior art organometallic catalysts. In a preferred embodiment, R1 is branched at the alpha carbon, the carbon atom closest to the carbon atom of the carboxylate functional group. For example, the alpha carbon is preferably bonded to two other carbon atoms, more preferably to three other carbon atoms. Preferred examples of bismuth carboxylate salts include bismuth neodecanoate, bismuth 2-ethylhexanoate, and bismuth pivalate.

Dialkyltin Dicarboxylate Complex

The catalyst composition according to the present invention preferably comprises a dialkyltin dicarboxylate complex having the structure II or III:

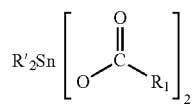
(II)

or

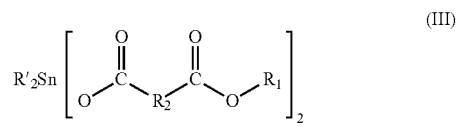
(III)

wherein $R_1$ is a branched $C_3$-$C_{20}$ alkyl or alkenyl group or substituted phenyl group, $R_2$ is a $C_1$-$C_6$ saturated or unsaturated linking group, and R' is a $C_1$-$C_{12}$ alkyl or alkenyl group.

In a preferred embodiment, R1 is branched at the alpha carbon, the carbon atom closest to the carbon atom of the carboxylate functional group. For example, the alpha carbon is preferably bonded to two other carbon atoms, more preferably to three other carbon atoms. Preferred examples of dialkyltin dicarboxylate complexes include dimethyltin dineodecanoate, dibutyltin di-2-ethylhexanoate, dibutyltin diiso-octylmaleate, and mixtures thereof.

Blowing Agent

Preferable blowing agents that can be employed in the instant invention include water, methylene chloride, acetone, methyl formate, dimethoxymethane, chlorofluorocarbons (CFCs), hydrocarbons such as n-pentane, isopentane, cyclopentane and their mixtures, and hydrohalocarbons including, but not limited to, hydrochlorofuorocarbons (HCFCs) such as HCFC-141b (commercially available as Genetron® 141b), HCFC-22, HCFC-123, hydrofluorocarbons such as HFC-245fa (commercially available as Enovate® 3000), HFC-134a (commercially available as Formacel® Z-4), HFC-365mfc (commercially available as Solkane® 365mfc), hydrofluoroolefins (HFOs) such as 1336mzz (Opteon®-1100), and HFO-1234ze(E) (Solstice® GBA), and hydrochlorofluoroolefins (HFCOs) such as HFCO-1233zd(E), (Solstice® LBA).

Preferably, the amount of blowing agent ranges from 5% to 25% by weight of the resin, more preferably, from 8% to 18% by weight of the resin and most preferably, from 10% to 15% by weight of the resin.

Other Catalysts

Optionally, other catalysts, such as tertiary amine catalysts, potassium carboxylate catalysts, quaternary amine carboxylate catalysts, and combinations thereof, may be used in the resin of the present invention. Preferred amine catalysts include DABCO 30®, available from Evonik Industries AG. When one or more amine catalysts are present, they preferably comprise, in combination, from 0.1% to 7% by weight of the resin component, more preferably from 0.3% to 5% by weight of the resin component, most preferably, from 0.5% to 2.0% by weight of the resin component.

Optional Additives

In embodiments, the resin or pre-mix can comprise one or more optional additives. Additives may comprise cell stabilizers such as organopolysiloxane surfactants; flame retardants such as halogenated organophosphorous compounds; and chain extenders such as ethylene glycol and butane diol. An exemplary fire retardant is trichloropropylphosphate. Additives may also comprise a compatibilizer to prevent phase separation in the resin blend.

The combined amount of the foregoing optional additives preferably ranges from 0.5% to 10% by weight of the resin, more preferably, from 1.0% to 8% by weight of the resin, and most preferably, from 1.5% to 7% by weight of the resin.

While any formulation suitable for polyurethane foam production can be employed for the pre-mix or resin, an example of resin formulation, including the relative amounts of the resin components, is shown in Table 1.

TABLE 1

| COMPONENT | % by Weight of the Resin |
|---|---|
| Polyether or Polyester Polyol | 65-85 |
| Fire retardant | 0-10 |
| Surfactant | 0-3 |
| Water | 0-5 |
| Blowing agent | 0-25 |
| Amine catalysts | 0.1-7 |
| Metal catalysts | 0-4 |
| Compatiblizer | 0-3 |

To form the foam composition, the foregoing components of the resin are contacted with a sufficient amount of isocyanate, in the form of crude MDI, in order to provide an isocyanate index in the range of 90 to 400.

While the principles of the invention have been described above in connection with preferred embodiments, it is to be clearly understood that this description is made only by way of example and not as a limitation of the scope of the invention.

The following examples are provided to illustrate certain aspects of the invention and shall not limit the scope of the appended claims.

EXAMPLES

Examples 1-2: Evaluation of Control Catalysts in a Polyurethane Formulation

The evaluation of catalyst reactivity in a polyurethane system was conducted using free-rise cup foam samples with a FOAMAT® sonar Rate-Of-Rise device (hereafter referred to as "ROR"). The FOAMAT device comprises a sonar sensor that measures and records the height in millimeters (mm) of the rising foam sample versus time in seconds(s), directly after mixing all components of the formulation. The FOAMAT standard software generates both height versus time plots and velocity versus time plots. These plots are useful for comparing the relative reactivity of different catalyst formulations.

One suitable resin formulation for making polyurethane foam samples for ROR measurement by the FOAMAT, including the relative amount of different components, is described below in Table 2.

TABLE 2

| Resin Formulation Examples 1 and 2 - Control Samples 1 and 2 | |
|---|---|
| COMPONENT | % by weight in resin |
| Polyether Polyol | 60-65 |
| Trichloropropylphosphate (flame retardant) | 12-18 |
| Dabco ® DC193 (surfactant) | 0.1-1.5 |
| Water | 1-3 |
| 245fa (blowing agent) | 5-10 |
| Polycat ® 30 amine catalyst | 0.5-2.0 |
| Metal Catalyst | 0.2-0.4 |
| Dabco ® PM301 (surfactant) | 1.0-2.0 |

The control experiments utilized commercially available organometallic catalysts in the resin formulation at a percent by weight of 0.25% of the resin formulation. The weight percent of the catalyst is given as the weight percent of the total resin blend including the polyol, fire retardant, surfactant, water, amine catalyst, metal catalysts, and blowing agent. For all examples, the ratio of polyol, fire retardant, surfactant, water, amine catalyst, blowing agent, and isocyanate are kept constant, and only the composition of the metal catalysts are varied.

One control sample comprised the formulation of Table 2, wherein the metal catalyst was bismuth neodecanoate at 20% bismuth by weight (commercially available as Dabco® MB20). A second control sample comprised the formulation of Table 2 wherein the metal catalyst was dibutyl tin dilaurylmercaptide at 17% by weight tin (commercially available as Dabco® T120).

The polyol, trichloropropylphosphate (fire retardant), Dabco® DC193 surfactant, water, Dabco® PM301 compatibilizer, Polycat® 30 amine catalyst, metal catalyst and 245fa blowing agent were combined in a Nalgene® container and agitated by shaking by hand until the mixture was well-blended to make the pre-mix or resin.

To make a foam sample for ROR reactivity measurements, 30 grams of the polyol pre-blend resin and the 30 grams of crude MDI were combined in a 32 oz (0.91 L) paper cup and mixed for 3 seconds at 8000 RPM using an overhead stirrer fitted with a 2-inch (5.1 cm) diameter mixing paddle. The cup is then placed under the FOAMAT sensor. The start time for ROR measurement is automated for the FOAMAT and begins directly after the end of the final mixing.

Once the cup is placed under the ROR, the chemical mixture begins to polymerize. The point in time at which bubbles start to make the level of liquid rise is known as the "cream time". The foam then rises toward the top of the cup. Since the walls of the cup restrict the expansion in all but the vertical direction, this expansion manifests itself in this experiment as an increase in height with passing time. The point at which the foam stops rising is known as the "rise time". The foam is still viscoelastic at this point and it is touched repeatedly with an object to see if a string of foam will attach. When strings can no longer be pulled from the foam, it has reached "string gel time". The foam tends to remain tacky for a few minutes after the string gel time. Useful comparisons can be made on the rate of the foaming reaction by recording the time required after mixing for the foam to reach 50% of its final height and by measuring the string gel time.

In Example 1, control sample 1 using Dabco® MB20 (bismuth neodecanoate at 20% by weight bismuth), the foam reached 50% of the final height at 11.3 seconds after mixing and exhibited a string gel time of 14.9 seconds after mixing.

In Example 2, control sample 2, using Dabco® T125 catalyst (dibutyltin diisooctylmaleate at 17% by weight tin), the foam reached 50% of the final height at 12.0 seconds after mixing and had a string gel time of 14.3 seconds after mixing.

Example 3: Evaluation of the Inventive Catalyst Combination of A Bismuth Carboxylate and a Dialkyltin Dicarboxylate A foam was prepared according to the same procedure described in Example 1. The metal catalyst contained a stable liquid combination of bismuth neodecanoate and dibutyltin diisooctylmaleate. The catalyst contained 6% by weight bismuth and 6% by weight tin. In this example the foam reached 50% of the final height in 12.0 seconds and had a string gel time of 15.0 seconds. This demonstrates the advantage of the present invention, in that utilizing a metal catalyst containing only 12% metal yielded the same reactivity and cure speed as single metal catalysts containing 17-20% metal.

Examples 4-11: Stability of Bismuth Carboxylate—Dialkyl Tin Dicarboxylate Mixtures In these eight examples, formulations of liquid bismuth carboxylate salts and liquid dialkyltin dicarboxylate complexes were prepared by mixing the two materials for one minute at a one-to-one weight ratio and observing the outcome. The results are shown in TABLE 3. In all the combinations, the bismuth compounds all contained carboxylate ions with branched alkyl substituents, one with an alpha carbon bound to two other carbon atoms (bismuth 2-ethylhexanoate) and one with an alpha carbon bound to three other carbon atoms (bismuth neodecanoate).

Combinations of bismuth-tin compounds were attempted with four dialkyltin dicarboxylate complexes, two with linear alkyl substituents on the carboxylate moiety (dibutyltin diacetate and dibutyltin dilaurate), and two with branched alkyl substituents on the carboxylate moiety (dibutyltin diisooctylmaleate and dimethyltin dineodecanoate). One of the branched alkyl substituents was branched distant from the alpha carbon (diisooctylmaleate), and the other at the alpha carbon (dineodecanoate).

The results demonstrate that stability of bismuth-tin carboxylate mixtures is favorable for carboxylates of bismuth and tin wherein the carboxylate groups of both compounds have branched alkyl chains as seen in Examples 8 through 11. In all these examples, a clear liquid composition was obtained when the carboxylate groups were substituted with branched alkyl chains. In contrast, where the dialkyltin dicarboxylate complex contained a linear alkyl chain on the carboxylate group, evidence of precipitation was observed in the form of a white solid in Examples 4 and 5, and as a cloudy or opaque liquid in Examples 6 and 7.

Stability is particularly favorable when the alpha carbon of the carboxylate group in one or both of the tin and bismuth compounds is bound to two or three other carbons, creating a branched alkyl chain in close proximity to the carboxyl functional group, as seen in the results for Examples 9 and 11.

TABLE 3

Stability of Bismuth Carboxylate - Dialkyltin Dicarboxylate Mixtures

| | | Bismuth Carboxylate Salt | |
| --- | --- | --- | --- |
| | | Bismuth 2-ethylhexanoate (branched) | Bismuth neodecanoate (branched) |
| Dialkyltin Dicarboxylate Complex | Dibutyltin diacetate (linear) | Example 4 White Solid with Clear Yellow Liquid on Top | Example 5 White Solid with Clear Liquid on Top |
| | Dibutyltin dilaurate (linear) | Example 6 Opaque White Liquid | Example 7 Opaque White Liquid |
| | Dibutyltin Diisooctylmaleate (branched) | Example 8 Clear Light Yellow Liquid | Example 9 Clear Liquid |
| | Dimethyltin Dineodecanoate (branched) | Example 10 Clear Light Yellow Liquid | Example 11 Clear Liquid |

The invention claimed is:

1. A storage-stable catalyst composition comprising at least one liquid bismuth carboxylate salt and at least one liquid dialkyltin dicarboxylate complex, wherein the bismuth carboxylate salt comprises bismuth neodecanoate, wherein the dialkyltin dicarboxylate complex comprises at least one member selected from the group consisting of dimethyltin dineodecanoate, dibutyltin di-2-ethylhexanoate, dibutyltin diiso-octylmaleate, and mixtures thereof; and wherein the catalyst composition remains a homogeneous liquid at ambient conditions.

2. The catalyst composition of claim 1, wherein the at least one bismuth carboxylate salt further comprises bismuth 2-ethylhexanoate, bismuth pivalate or a combination thereof.

3. A method for preparing a polyurethane foam comprising contacting at least one polyol, at least one isocyanate and at least one blowing agent in the presence of the catalyst composition of claim 1.

4. The method of claim 3, wherein the contacting step is accomplished using at least one polyol selected from the group consisting of polyether polyol, mannich polyol, recycled polyol, soy polyol, sucrose or sugar based polyol, carbon dioxide based polyol and mixtures thereof.

5. The method of claim 3, wherein the the contacting step is accomplished using at least one isocyanate selected from the group consisting of hexamethylene diisocyanate, isophorone diisocyanate, phenylene diisocyante, toluene diisocyanate ("TDI"), 4,4'-diphenyl methane diisocyanate ("MDI") and mixtures thereof.

6. The method of claim 3, wherein the contacting step is accomplished using at least one blowing agent selected from the group consisting of a hydrohalocarbon, a hydrofluoroolefin, a hydrocarbon, water or carbon dioxide.

7. The catalyst composition of claim 1, wherein the weight ratio of the at least one bismuth caboxylate salt to the at least one dialkyltin dicarboxylate complex is from 9 to 1 to 1 to 9.

8. The method of claim 3, wherein the contacting step further comprises using a co-catalyst selected from the group consisting of tertiary amine, potassium carboxylate, quaternary amine carboxylate, and combinations thereof.

* * * * *